United States Patent Office 2,800,478
Patented July 23, 1957

2,800,478

3-SUBSTITUTED-8-ALKYLNORTROPANES AND THE ACID AND QUATERNARY AMMONIUM SALTS THEREOF

Charles L. Zirkle, Haddon Heights, N. J., assignor to Smith, Kline & French Laboratories, Philadelphia, Pa., a corporation of Pennsylvania No Drawing. Application July 1, 1955,
Serial No. 519,646

6 Claims. (Cl. 260—292)

This invention relates to certain new physiologically active 3-substituted-8-alkylnortropanes, the non-toxic organic and inorganic salts thereof and the quaternary ammonium salts thereof.

The new chemical compounds according to this invention have utility, for example, for treating the parasympathetic nervous system in providing, for example, antispasmodic and anticholinergic action and further have utility as antiemetics and for treating the central nervous system, for example, for treating psychotics and psychoneurotics. The compounds of this invention also have utility as intermediates for use in the preparation of compounds having utility for treating the parasympathetic nervous system in providing, for example, antispasmodic and anticholinergic action and further having utility as antiemetics and for treating the central nervous system, for example, for treating psychotics and psychoneurotics. Where the salts are used for therapeutic purposes, it will be obvious to those skilled in the art to select a non-toxic salt.

The new compounds according to this invention have the structure shown by the following formula:

FORMULA 1

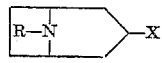

in which: R is a straight or branched chain lower alkyl radical having preferably 1 to 4 carbon atoms.
X is selected from the group consisting of

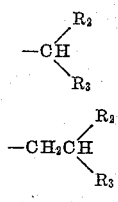

which is preferred;

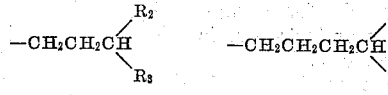

$R_2$ and $R_3$ being selected from the group consisting of straight or branched chain lower alkyl groups having preferably from 1 to 6 carbon atoms, cycloalkyl groups having from 5 to 6 carbon atoms, cycloalkyl-alkyl having 6 to 10 carbon atoms, 2-pyridyl, phenyl, phenyl substituted with alkyl groups having not in excess of 4 carbon atoms, phenyl substituted with alkoxy groups having not in excess of 4 carbon atoms.

More succinctly, the new compounds of this invention have the structure shown in the following formula:

FORMULA 2

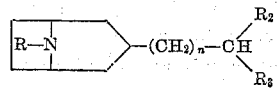

in which: R, $R_2$ and $R_3$ are as given above and $n$ is from 0 to 3, preferably 1.

Where hereinafter the symbols R, $R_2$ and $R_3$ and $n$ are mentioned in the description, they will indicate the substituents indicated for them in connection with the above general formulas.

The organic and inorganic salts of the base of the above formulas contemplated by this invention include by way of example salts of the base formed with organic acids such as, for example, tartaric, maleic, camphorsulfonic, citric, acetic, propionic, butyric, succinic, glutaric, adipic, ascorbic, lactic, levulinic, malic, mandelic, cinnamic, gluconic, methanesulfonic, benzene sulfonic, fumaric, citraconic, itaconic, lauric, stearic, myristic, palmitic, linoleic, aspartic and sulfoacetic, and inorganic acids such as, for example, hydrochloric, hydrobromic, sulfuric, sulfamic, phosphoric, nitric, etc. and can readily be produced by reacting the free base with the appropriate acid.

This invention also embraces quaternary ammonium salts formed with organic esters of sulfuric, hydrohalic and aromatic sulfonic acids. Exemplary of such esters are methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene-sulfonate, ethyl toluene-sulfonate, and the like.

The quaternary ammonium salts will be prepared by treating a solution of the base of the above structural formulas in a suitable solvent such as chloroform, acetone, benzene, toluene or ether with an excess of an organic ester of sulfuric, hydrohalic or aromatic sulfonic acid. This reaction will be carried out most advantageously at a temperature in the range of from about 25° C. to about 115° C.

Compounds having the structure of Formula 2 may be prepared by first producing a compound of the following structure:

FORMULA 3

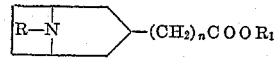

in which: R is a straight or branched chain lower alkyl radical having preferably from 1 to 4 carbon atoms.
$R_1$ is selected from the group consisting of hydrogen and a straight or branched chain lower alkyl radical having preferably from 1 to 4 carbon atoms and $n$ is from 0 to 3.

The compounds of Formula 3 may be variously produced by Methods A through D.

METHOD A

The compounds of Formula 3 where $n$ is 0 are obtained by the reaction sequence outlined below:

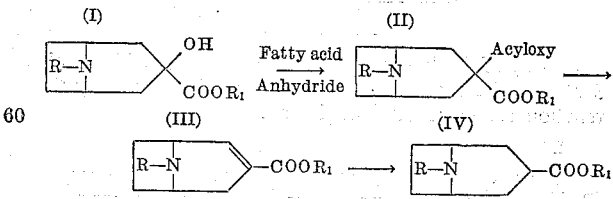

The acyloxy ester (II) is obtained in good yield when the hydroxy ester (I), preferably with $R_1$=methyl, is treated with an excess of lower fatty acid anhydride having preferably 4 to 8 carbon atoms, advantageously with an excess of acetic anhydride. Pyrolysis of the acyloxy ester (II) using a temperature of about 350° C. to about 500° C. by passage of the acyloxy ester through a column packed with, for example, inert heat resistant beads, tubes or rods such as clay or heat resistant glass (Pyrex) beads, tubes or rods, and swept with nitrogen, and heated to a temperature in the range of about 350° C. to about 500° C. furnishes the unsaturated ester (III). The saturated ester (IV, $R_1$=lower alkyl) is obtained by hydrogenation of the unsaturated ester (III) using, for example, a noble metal catalyst such as platinum or palladium or a Raney nickel catalyst and at room temperature and atmospheric pressure or at elevated temperatures and pressures. The acid (IV, $R_1$=H) is obtained as the hydrochloride salt by refluxing the saturated ester with an excess of hydrochloric acid and then removing the excess acid in vacuo. The thus formed acid is readily esterified to produce the ethyl, propyl, butyl esters, etc. using ethanol, propanol and butanol, etc., respectively.

METHOD B

The preparation of the compounds of Formula 3 above where $n$ is from 1 to 3 is illustrated for the preparation of these compounds where $n$=1 in the scheme below:

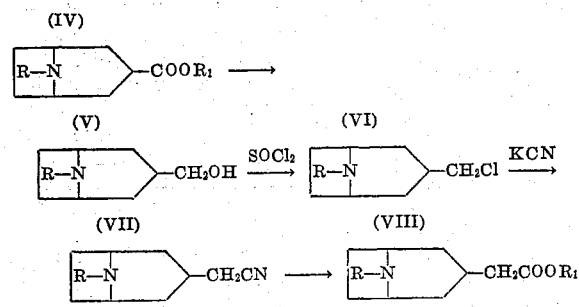

The carboxylic acid or ester (IV) is reduced to the carbinol (V) using, for example, lithium aluminum hydride, or in the case of the esters, using sodium-alcohol combinations, or catalytic hydrogenation. The halide (VI), in the form of its hydrochloride salt, is obtained from the reaction of (V) with excess thionyl chloride. The halide base (VI) is converted to the nitrile (VII) by reaction with sodium or potassium cyanide preferably in an aqueous alcohol medium. The acid (VIII, $R_1$=H) is formed by acidic or basic hydrolysis of the nitrile (VII). The ester (VIII, $R_1$=lower alkyl) may be obtained by esterification of the acid (VIII, $R_1$=H) or alternatively by alcoholysis of the nitrile (VII).

It will be apparent to those skilled in the art that the application of the above reaction sequence to the ester or acid (VIII) will furnish the ester or acid having the following structure:

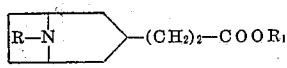

and that in turn when this compond is subjected to the above reaction sequence a compound having the following structural formula will result:

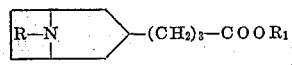

METHOD C

By way of further example, the compounds of Formula 3 above where $n$ is 1 may also be readily made by the reaction sequence outlined below:

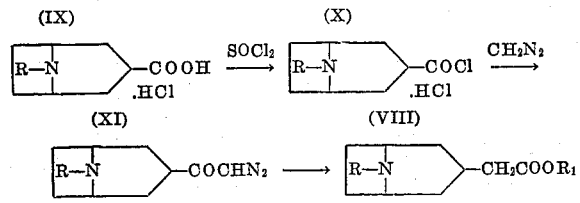

The hydrochloride of the amino acid (IX) is converted to the acid chloride hydrochloride (X) which in turn yields the diazoketone (XI) by reaction with a large excess of diazomethane. The diazoketone (XI) is converted in the presence of a suitable catalyst, as, for example, silver oxide and a suitable medium such as, for example, methanol, ethanol, propanol, or butanol, to the ester (VIII). Where an aqueous medium is used the carboxylic acid (VIII) is produced. Similarly, the hydrochloride of the amino acid

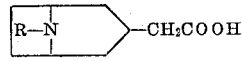

when used as the starting material in the above described reaction sequence will form the compounds of Formula 3 above where $n$=2. Similarly the hydrochloride of the compound of Formula 3 where $n$=2 can then in turn be used as the starting material in the reaction sequence given above to form the compounds of Formula 3 above where $n$=3.

METHOD D

The compounds of Formula 3 above where $n$=1 may also be formed by the following reaction sequence:

An N-alkyl-nor-tropinone (XII) is reacted with a lower alkyl ester of cyanoacetic acid such as methyl, ethyl or butyl, cyanoacetate (the ethyl ester being specifically illustrated above) using as a solvent, for example, a lower fatty acid such as propionic, acetic or butyric acid and preferably in the presence of a catalyst which is a salt of a weak acid and a weak base, for example, ammonium acetate. The thus formed unsaturated cyano ester is then hydrogenated at a temperature of about 40° C. to 80° C. in the presence of a noble metal catalyst such as platinum or palladium to the N - lower alkyl - 3 - [(α - cyano - α - carbalkoxy)-methyl]-nortropane. Saturated cyano ester (XIII) is hydrolyzed and decarboxylated to 3(N - alkyl - nortropane)-acetic acid by heating with an excess of a volatile mineral acid such as a hydrohalic acid such as hydrobromic or hydrochloric acid. The removal of the excess mineral acid by distillation in vacuo leaves the amino acid salt (VIII, $R_1$=H) which can readily be esterified with a lower aliphatic alcohol in the presence of a strong acid, for example, a hydrohalic acid such as hydrochloric or hydrobromic acid, sulfuric acid or para toluenesulfonic acid.

The esters of Formula 3 may then be employed to produce the tertiary amino alcohol derivative having the following structure when $R_2$ and $R_3$ are the same:

FORMULA 4

This is accomplished by reacting the esters of Formula 3 with the lithium or magnesium derivative prepared from lower alkyl bromides, cyclohexyl bromide, cyclopentyl bromide, cycloalkyl-alkyl bromides having from 6 to 10 carbon atoms, phenyl bromide, lower alkyl or lower alkoxy substituted phenyl bromides and 2-bromopyridine as illustrated by the following general scheme:

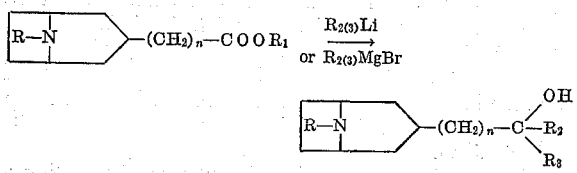

In general, it will be desirable to use the lithium derivative instead of the magnesium derivative, except in the case of cycloalkyl bromides, since the chief product using the organo magnesium reagent will usually be the corresponding ketone and the desired carbinol will be formed only in low yield. In carrying out this reaction, it is advantageous to use a solvent such as diethyl ether and to employ an excess of the organometallic reagent.

The tertiary amino alcohols of Formula 4 where $R_2$ and $R_3$ are the same or different can be prepared by utilizing the compounds of Formula 3 to prepare an intermediate compound having the following structure:

FORMULA 5

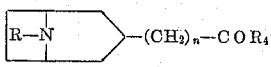

in which: $R_4$ is selected from the group consisting of lower alkyl, cyclopentyl, cyclohexyl, cycloalkyl-alkyl having 6 to 10 carbon atoms, phenyl, phenyl substituted with an alkyl group containing not in excess of 4 carbon atoms and phenyl substituted with an alkoxy group containing not more than 4 carbon atoms.

The compounds of Formula 5 are readily formed by reacting the Grignard derivative prepared from lower alkyl bromides, phenyl bromide, alkyl substituted phenyl bromide, alkoxy substituted phenyl bromide, cyclohexyl bromide, cyclopentyl bromide or cycloalkyl-alkyl bromide having 6 to 10 carbon atoms with of the esters defined in Formula 3 above. It is desirable to carry out the Grignard reaction in a solvent, such as diethyl ether, using a molar excess of the Grignard reagent. The resulting amino ketones (Formula 5) will be isolated and purified by distillation or by the crystallization of the organic or inorganic acid salts from a suitable solvent. The intermediate amino ketone compounds of Formula 5 are also readily formed by the reaction of the lithium derivative prepared from lower alkyl bromides, cycloalkylalkyl bromides having 6 to 10 carbon atoms, phenyl bromide, alkyl substituted phenyl bromides, alkoxy substituted phenyl bromides with one of the carboxylic acids defined in Formula 3 above. This reaction is carried out using a solvent such a diethyl ether and preferably employing an excess of the lithium reagent.

The intermediae amino ketone of Formula 5 can then be used to produce the tertiary amino alcohols of Formula 4 where $R_2$ and $R_3$ are the same or different as illustrated by the following scheme:

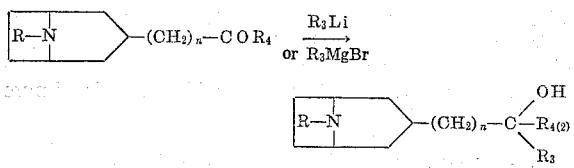

The ketone is variously reacted with the lithium or magnesium derivative prepared from lower alkyl bromides, cycloalkylalkyl bromides having 6 to 10 carbon atoms, phenyl bromides, substituted phenyl bromides, 2-bromopyridine, cyclopentyl bromide or cyclohexyl bromide depending on the end product desired and desirably in a solvent such as diethyl ether and using an excess of the lithium or magnesium reagent. In general, superior yields are achieved using the lithium derivatives.

The compounds of this invention (Formula 2) may be prepared by reducing the tertiary amino alcohols of Formula 4 with phosphorous and hydriodic acid as shown in the following scheme:

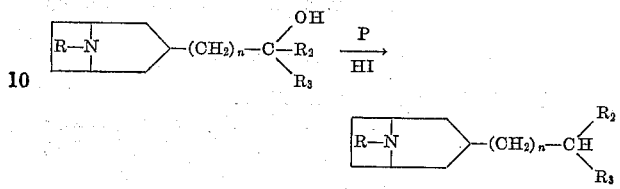

This reaction is preferably carried out by refluxing for from about 2 to about 5 hours a solution of the tertiary amino alcohol in a mixture of an excess of concentrated (about 57%) hydriodic acid and acetic acid in the presence of red phosphorous which may be present in an amount of about 1 part by weight of red phosphorous to about 4 parts by weight of amino alcohol. Preferably, the hydriodic acid and the glacial acetic acid will be mixed in a ratio of about 2 parts by volume of the hydriodic acid to 6 parts by volume of the glacial acetic acid.

The above method will preferably be used where the compounds of this invention are as follows: where $R_2$ is aromatic and $R_3$ is alkyl, cycloalkyl or cycloalkylalkyl. Alternatively, the compounds of this invention can be prepared by utilizing the tertiary aminoalcohols of Formula 4 to prepare the dehydration products of these alcohols and then hydrogenating the latter to produce the compounds of this invention.

More specifically, the dehydration to produce the dehydration products of Formula 4 can be readily accomplished by, for example, treating the alcohols of Formula 4 with a dehydration agent and separating out the dehydrated product. Exemplary of dehydration agents are a mineral acid such as, for example, hydrochloric, sulfuric, phosphoric and organic acids such as oxalic, trichloracetic, lower fatty acid anhydrides such as acetic anhydride and propionic anhydride, carboxylic acid chlorides, such as acetyl chloride and propionyl chloride or thionyl chloride.

Thus, by way of more specific example, the amino alcohol can be dissolved in a mixture of acetic acid and concentrated hydrochloric acid and this solution refluxed for a period of ten minutes to one hour. The hydrochloride may then be isolated by removing the acetic acid and excess hydrochloric acid by evaporation under reduced pressure. The free base can be obtained by treating the thus formed hydrochloride with an excess of alkali or other base such as, for example, sodium hydroxide or ammonia and then extracting the free base into a solvent such as ether or chloroform. The thus obtained solution may be dried and treated with other acids to form different salts or the solution can be reacted with an excess of an organic ester of sulfuric, hydrohalic or aromatic sulfonic acid to form a quaternary ammonium salt.

The thus formed dehydration products in the form of their base or salt in a suitable solvent, such as ethanol, are hydrogenated in the presence of a suitable catalyst, such as platinum, palladium or Raney nickel. The hydrogenation is carried out preferably at pressures ranging from atmospheric to one-thousand pounds per square inch and at temperatures ranging from room temperature to 100° C. The catalyst will be removed by filtration and the solvent evaporated. The end product in its pure state can then be obtained either in the form of a salt by crystallization or in the form of a base by fractional distillation in vacuo.

By way of a still further example the compounds of this invention can be produced by refluxing a solution of the dehydration products of the compounds of Formula 4 in the presence of a suitable hydrogen donor, such as cyclohexene, and a suitable catalyst, such as palladium. The reaction may be carried out in the presence of a suitable solvent, such as tetrahydrofuran or ethanol, or in the presence of excess cyclohexene as solvent. The product is isolated by removing the catalyst by filtration and evaporating the solvent.

This invention will be further clarified by the following examples:

*Example 1.—3-benzohydryltropane*

*Methyl 3-(3-acetoxytropane)carboxylate (α-ecgonine acetate)*.—A solution of 10 g. of methyl 3-(3-hydroxytropane)-carboxylate (methyl α-ecgonine) (Willstatter, Ber. 29, 1575 (1896)) in 50 ml. of acetic anhydride is heated at 100° C. for 4 hours. The excess acetic anhydride and acetic acid are removed in vacuo and the residue poured into ice water. The mixture is saturated with potassium carbonate and the product extracted with ether. After evaporation of ether the crude methyl 3-(3-acetoxytropane)-carboxylate is purified by distillation; B. P. 162–165° C. (15 mm.); M. P. 66–67° C.

*Methyl 3-(2-tropene)carboxylate*.—Methyl 3-(3-acetoxytropane)-carboxylate (29 g.) is added dropwise over a 7 min. period to a vertical Pyrex tube (25 mm. diameter), packed for a length of 8 in. with ¼ to ½ in. pieces of Pyrex tubing of 7 mm. diameter, and heated at 420° C. During the addition, the apparatus is swept out with nitrogen. The product, collected by means of an efficient condenser at the bottom of the tube, is dissolved in dilute hydrochloric acid and the mixture extracted with three portions of ether. The aqueous acid solution is saturated with potassium carbonate and the product removed by extraction with ether. Distillation of the ether solution gives methyl 3-(2-tropene)-carboxylate as a pale yellow liquid, B. P. 131–134° C. (15 mm.); $n_D^{25.5}$ 1.4998.

*Methyl 3-tropanecarboxylate*.—Methyl 3-(2-tropene)-carboxylate (13 g.) dissolved in 100 ml. of methanol is hydrogenated over 5 g. of Raney nickel catalyst at 50 p. s. i. pressure at room temperature until hydrogen absorption ceases. Distillation of the mixture, after removal of the catalyst by filtration, gives methyl 3-tropanecarboxylate as a colorless liquid, B. P. 128–132° C. (18 mm.); $n_D^{25}$ 1.4819.

*Diphenyl-3-tropanecarbinol*.—A solution of phenyl lithium in 100 ml. of ether is prepared in the usual way from 34.5 g. of bromobenzene and 3.5 g. of lithium. To the stirred solution cooled at 0° C. is slowly added 10.1 g. of methyl 3-tropanecarboxylate dissolved in 100 ml. of ether. The mixture is stirred 90 min. at room temperature and then added to 150 ml. of water. The white solid which forms is collected on a filter and washed with ether. Recrystallization of the solid from ethyl acetate gives diphenyl 3-tropanecarbinol which melts at 185.5–186° C.

*3-benzohydrylidenetropane*.—A solution of 5.6 g. of dihpenyl-3-tropanecarbinol in a mixture of 20 ml. of glacial acetic acid and 25 ml. of dilute hydrochloric acid is heated at reflux for 10 min. and then evaporated to dryness in vacuo. Crystallization of the residue from a mixture of ethanol and ether gives 3-benzohydrylidenetropane hydrochloride as white crystals melting at 275–278° C.

To obtain the free base, the hydrochloride salt is added to 40% sodium hydroxide solution and the mixture extracted with ether. Evaporation of the ether solution gives 3-benzohydrylidenetropane as a colorless oil.

*3-benzohydryltropane*.—4 grams of 3-benzohydrylidenetropane dissolved in ethanol is hydrogenated over Raney nickel at 400 p. s. i. and 60° C. until hydrogen absorption ceases. Evaporation of the alcohol gives an oil which is purified by absorption on a neutral alumina column from petroleum ether solution followed by elution with benzene and chloroform. In this way 3-benzohydryltropane is obtained as a white solid melting at 70–72° C.

*3-benzohydryltropane hydrochloride*.—Treatment of 1 g. of 3-benzohydryltropane with ethereal hydrogen chloride solution gives the hydrochloride salt which is purified by recrystallization from a mixture of ethanol and ether. The salt does not melt when heated to 310° C.

*3-benzohydryltropane methobromide*.—By allowing a mixture of 1 g. of 3-benzohydryltropane and excess methyl bromide in acetone solution to stand for 3 hours at room temperature, the methobromide salt melting at 277–279° C. is obtained.

*3-benzohydryltropane etho-ethylsulfate*.—By heating a mixture of one gram of 3-benzohydryltropane and excess diethylsulfate in acetone solution at reflux temperature for 5 hours the quaternary ammonium salt is obtained as a white solid.

*Example 2.—1,1-diphenyl-2-(3-tropane)ethane*

*Ethyl cyano 3-tropaneacetate*.—A mixture of 13.9 g. of tropinone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 50° C. Hydrogenation is interrupted when one mole equivalent of hydrogen has been absorbed. After removal of the catalyst, the solution is evaporated in vacuo on a warm water bath. The amber oily residue is dissolved in dilute hydrochloric acid and the solution extracted with ether. The acid solution is neutralized and saturated with potassium carbonate and the product removed by extraction with ether. Distillation of the ether solution gives ethyl cyano 3-tropaneacetate as a yellow oil, B. P. 116–118° C. (0.3 mm.); $n_D^{24}$ 1.4942.

*Ethyl 3-tropaneacetate*.—A solution of 8 g. of ethyl cyano 3-tropaneacetate in 30 ml. of 37% hydrochloric acid is refluxed for 13 hours. The solution is evaporated in vacuo and the residue dried by successive addition and removal by distillation of absolute ethanol. The crude 3-tropaneacetic acid hydrochloride is esterified by allowing its solution in 50 ml. of dry ethanol saturated with hydrogen chloride to stand 3 days at room temperature. Most of the alcohol is distilled in vacuo, cold concentrated potassium hydroxide solution is added to the residue and the product removed by extraction with ether. After distillation of the solvent, ethyl 3-tropaneacetate is obtained as a colorless oil distilling at 104–105° C. (2 mm.); $n_D^{25}$ 1.4774.

*1,1-diphenyl-2-(3-tropane)ethanol*.—To a solution of phenyl lithium in 360 ml. of ether, prepared from 94 g. of bromobenzene and 8.3 g. of lithium cooled to 0° C. is slowly added with stirring a solution of 42 g. of ethyl 3-tropane-acetate in 100 ml. of ether. Following the addition the mixture is stirred at 0° C. for one hour and then at room temperature for 3.5 hours. The ether solution is decanted from the solid lithium complex which forms and added with shaking to ice water. The ether layer is removed and the solvent evaporated to give solid crude 1,1-diphenyl-2-(3-tropane)ethanol. To the solid lithium complex is added a mixture of equal volumes of ice water and chloroform and the mixture is stirred mechanically until two clear layers result. The chloroform layer is separated and the solvent evaporated to give an additional amount of the amino diphenylcarbinol. The solids from the ether and chloroform extracts are combined, washed with a small volume of ether, and recrystallized from ethyl acetate to give white crystals of pure 1,1-diphenyl-2-(3-tropane)ethanol, M. P. 146.5–147.5° C.

*1,1-diphenyl-2(3-tropane)ethylene.*—A solution of 14.6 g. of 1,1-diphenyl-2-(3-tropane)ethanol in a mixture of 29 ml. of 37% hydrochloric acid and 100 ml. of acetic acid is refluxed for 30 minutes. Evaporation of the mixture to dryness in vacuo gives the crystalline hydrochloride of 1,1-diphenyl-2-(3-tropane)ethylene which is purified by recrystallization from a mixture of alcohol and ether. The pure amine salt melts at 217–218° C.

To obtain the free base the amine hydrochloride is shaken with a mixture of ether and concentrated ammonium hydroxide solution. The ether layer is separated and the solvent evaporated to give 1,1-diphenyl-2-(3-tropane)ethylene as a white crystalline solid which melts at 109.5–110° C. after recrystallization from acetone.

*1,1-diphenyl-2-(3-tropane)ethane.*—10 grams of 1,1-diphenyl-2-(3-tropane)ethylene dissolved in ethanol is hydrogenated over Raney nickel at 500 p. s. i. and 60° C. until hydrogen absorption ceases. After removal of the catalyst and evaporation of the solvent 1,1-diphenyl-2-(3-tropane)ethane is obtained as a colorless oil.

The hydrochloride of the base, formed in ethereal hydrogen chloride solution, melts at 244–245° C. after recrystallization from a mixture of ethanol and ether.

*1,1-diphenyl-2-(3-tropane)ethane methobromide.*—By allowing a mixture of 1 gram of 1,1-diphenyl-2-(3-tropane)ethane and excess methylbromide dissolved in acetone to stand at room temperature for several hours, the methobromide salt is obtained as white crystals. The product, after recrystallization from a mixture of ethanol and ether, melts at 257–258° C.

*1,1-diphenyl-2-(3-tropane)ethane metho-p-toluenesulfonate.*—An acetone solution of one gram of 1,1-diphenyl-2-(3-tropane)ethane and excess methyl p-toluenesulfonate is heated at reflux temperature for five minutes. By addition of ether to the cooled solution the quaternary ammonium salt is precipitated as a white solid.

*1,1-diphenyl-2-(3-tropane)ethane maleate.*—By adding 0.12 g. of maleic acid to 0.30 g. of 1,1-diphenyl-2-(3-tropane)ethane dissolved in ethanol and evapoating the resulting solution to dryness in vacuo the maleate salt of the base is obtained.

*Example 3.—1-phenyl-1-(2-pyridyl)-2-(3-tropane)ethane*

*3-tropaneacetic acid hydrochloride.*—Ethyl 3-tropaneacetate (made following the procedure of Example 2) is dissolved in 37% hydrochloric acid and the solution refluxed for several hours. Evaporation of the solution to dryness in vacuo gives 3-tropaneacetic acid hydrochloride which melts at 172–174° C. after recrystallization from a mixture of methanol and ether.

*Phenyl 3-tropanemethyl ketone.*—A solution of phenyl lithium in 100 ml. of ether is prepared in the usual way under nitrogen from 31.4 g. of bromobenzene and 2.8 g. of lithium. In one portion, 11 g. of 3-tropaneacetic acid hydrochloride is added and the mixture is heated to reflux temperature with stirring. The heat source is removed and the mixture allowed to reflux spontaneously until the reaction subsides. Heating and stirring are then continued for nine hours. The mixture is cooled to 0° C. and decomposed by the slow addition of 50 ml. of water. The ether layer is removed, the aqueous layer extracted with ether, and the extracts are dried over sodium sulfate. Passage of hydrogen chloride into the ether solution precipitates the hydrochloride salt of phenyl 3-tropanemethyl ketone. The crude salt, after washing with ether, is reconverted to the base by treatment with ammonium hydroxide and extraction of the product with ether. Distillation of the ether extract under reduced pressure gives phenyl 3-tropanemethyl ketone, B. P. 138–141° C. (0.2 mm.).

*1-phenyl-1-(2-pyridyl)-2-(3 - tropane)ethanol.*—A solution of n-butyl lithium in 25 ml. of ether is prepared in the usual way from 3.7 g. of n-butyl chloride and 0.7 g. of lithium. With stirring the solution is cooled to −45° C. and 5.5 g. of 2-bromopyridine dissolved in 10 ml. of ether is added slowly. After the addition, the mixture is stirred 10 minutes and 2.5 g. of phenyl 3-tropanemethyl ketone dissolved in 30 ml. of ether is added slowly. The mixture is then stirred 15 minutes at −15° C. Water (50 ml.) is added slowly and the mixture is stirred vigorously for 15 minutes. A yellow solid forms which is collected on a filter and washed with ether. The ether layer in the filtrate is separated and saved. The solid is stirred vigorously in a mixture of equal volumes of chloroform and water until two clear layers result. The chloroform layer is removed and combined with the ether solution above. Evaporation of the solvents in vacuo gives a yellow oil which crystallizes when stirred with ether. By recrystallization of the product from ethyl acetate 1-phenyl-1-(2-pyridyl)-2-(3-tropane)ethanol is obtained as white crystals melting at 117–118.5° C.

*1 - phenyl - 1 - (2 - pyridyl) - 2 - (3 - tropane)ethylene.*—A mixture of one gram of 1-phenyl-1-(2-pyridyl)-2-(3-tropane)ethanol and 2 ml. of 85% sulfuric acid is heated at 155° C. for 15 minutes. The cooled mixture is added to ice water, the resulting solution made basic with ammonium hydroxide, and the product is removed by extraction with several portions of chloroform. Evaporation of the chloroform gives 1-phenyl-1-(2-pyridyl)-2-(3-tropane)-ethylene as a solid melting at 91–93° C. By recrystallizing the solid several times from acetone white crystals melting at 97.5–99.5° C. are obtained.

*1-phenyl-1-(2-pyridyl)-2-(3 - tropane)ethane.*—A mixture of 0.2 g. of 1-phenyl-1-(2-pyridyl)-2-(3-tropane)-ethylene, 5 g. of cyclohexene and 0.3 g. of 20% palladium-on-charcoal catalyst is heated at reflux temperature for 48 hours. Removal of the catalyst by filtration and evaporation of the solution in vacuo gives 1-phenyl-1-(2 - pyridyl)-2-(3 - tropane)ethane as a thick colorless oil. Addition of the base to ethanolic picric acid solution gives the dipicrate salt which melts at 201–203° C. after recrystallization from aqueous acetone solution.

*1-phenyl-1 - (2 - pyridyl) - 2 - (3 - tropane)ethane tartrate.*—A solution of 0.17 g. of tartaric acid in ethanol is added to 0.30 g. of 1-phenyl-1-(2-pyridyl)-2-(3-tropane)ethane dissolved in ethanol. Addition of ether to the solution precipitates the tartrate salt melting at 78–80° C. after recrystallization from ethanol-ether.

*Example 4.—1-ethyl-1-phenyl-2-(3-tropane)ethane*

*1-ethyl-1-phenyl-2-(3-tropane)ethanol.*—A solution of ethyl magnesium bromide in 200 ml. of ether is prepared from 7.3 g. of magnesium and 32.7 g. of ethyl bromide in the usual way. While the solution is stirred and cooled at 0° C., 12.2 g. of phenyl 3-tropanemethyl ketone (made following the procedure of Example 3) dissolved in 50 ml. of ether is added slowly. The reaction mixture is stirred 1.5 hours at room temperature and then 1.5 hours at reflux temperature after which time it is decomposed by addition to a mixture of cracked ice and 21 g. of ammonium chloride in 50 ml. of water. The ether layer is removed and the aqueous phase extracted twice with chloroform. Evaporation of solvents from the combined extracts gives an oily residue which yields, when stirred with ether, 1-ethyl-1-phenyl-2-(3-tropane)ethanol as a white powder melting at 119–120° C. From the filtrate from the solid is recovered the starting material, phenyl 3-tropanemethyl ketone.

*Product from the dehydration of 1-ethyl-1-phenyl-2-(3-tropane)ethanol.*—A solution of 0.44 g. of 1-ethyl-1-phenyl-2-(3-tropane)ethanol in 3 ml. of concentrated hydrochloric acid is heated at 100° C. for 40 minutes. Evaporation of the solution to dryness in vacuo gives the extremely hygroscopic hydrochloride salt of the dehydration product of the amino carbinol. By recrystallization of the solid from ethanol-butanone white crystals melting over the range of 170° C. to 200° C. are obtained.

*1-ethyl-1-phenyl - 2 - (3 - tropane)ethane.*—The unsaturated product obtained above is dissolved in ethanol and hydrogenated over Raney nickel catalyst at 60° C. and 500 p. s. i. hydrogen pressure. After removal of the catalyst by filtration and evaporation of the solvent in vacuo, 1-ethyl-1-phenyl-2-(3-tropane)ethane is obtained as a colorless oil. By addition of hydrogen chloride to an ether solution of the base the white crystalline hydrochloride salt is obtained.

Example 5.—1-(2-cyclohexylethyl)-1-phenyl-2-(3-tropane)ethane

*2-cyclohexylethyl 3-tropanemethyl ketone.*—An ether solution of 2-cyclohexylethyl magnesium bromide is prepared in the usual way from 7 g. of magnesium and 51.8 g. of cyclohexylethyl bromide. To the stirred solution cooled to 0° C. is added slowly 15 g. of ethyl 3-tropaneacetate (made following the procedure of Example 2) dissolved in 30 ml. of ether. The mixture is stirred at 0° C. for 0.5 hr. and then at room temperature for 2.5 hours. The mixture is again cooled to 0° C. and a solution of 290 g. of the sodium salt of ethylenediamine tetraacetic acid in 345 ml. of water is added slowly with stirring. The ether layer is removed and the aqueous mixture extracted with several portions of ether. Distillation of the ether solution under reduced pressure gives 2-cyclohexylethyl 3-tropanemethyl ketone; B. P. 157–164° C. (0.7 mm.); $n_D^{24.5}$ 1.5010.

*1-(2-cyclohexylethyl)-1-phenyl-2-(3-tropane)ethanol.*—A solution of phenyl lithium in 75 ml. of ether is prepared in the usual way from 0.8 g. of lithium and 9.4 g. of bromobenzene. With stirring 7.7 g. of 2-cyclohexylethyl 3-tropane-methyl ketone dissolved in 20 ml. of ether is slowly added to the solution cooled to 0° C. The mixture is stirred one hour at 0° C. and 3 hours at room temperature. Ice water is then slowly added and the resulting mixture stirred vigorously for 30 minutes. The ether layer is separated and the aqueous layer extracted with ether. On evaporation of the ether solution (dried over sodium sulfate) a clear oil is obtained which crystallizes when stirred with a small volume of petroleum ether. Recrystallization of the white solid from ethyl acetate gives transparent crystals of 1-(2-cyclohexylethyl)-1-phenyl-2-(2-tropane)-ethanol melting at 104–106° C.

*1-(2-cyclohexylethyl)-1-phenyl-2-(3-tropane)-ethane.*—A mixture of 0.5 g. of 1-(2-cyclohexylethyl)-1-phenyl-2-(3-tropane)ethanol, one milliliter of hydriodic acid (sp. g. 1.70), 3 ml. of glacial acetic acid, and 0.13 g. of red phosphorus is heated at reflux temperature for 3.5 hours. The hot solution is filtered and the filtrate is diluted with water. The crude hydroiodide salt of 1-(2-cyclohexylethyl)-1-phenyl-2-(3-tropane)ethane separates as a dark oil which gradually crystallizes. The salt is washed successively with water and ether and then recrystallized from ethanol-ether mixture to give almost colorless crystals melting at 175° C.

Treatment of the hydroiodide salt with concentrated ammonium hydroxide solution gives the free base which is removed from the aqueous mixture by extraction with ether. Evaporation of the ether solution gives the product as a colorless oil.

Addition of hydrogen chloride to an ethereal solution of the base gives the hydrochloride salt which melts at 198–200° C. after recrystallization from acetone.

Example 6.—1-cyclohexyl-1-phenyl-2-(3-tropane)ethane

*Cyclohexyl 3-tropanemethyl ketone.*—A solution of cyclohexyl magnesium bromide in 700 ml. of ether is prepared in the usual way from 11.5 g. of magnesium and 77 g. of cyclohexyl bromide. To the stirred solution cooled to 0° C. is added slowly 25 g. of ethyl 3-tropaneacetate (made following the procedure of Example 2) dissolved in 45 ml. of ether. The mixture is stirred at 0° C. for 0.5 hr. and then heated at the reflux temperature for 5 hours. The mixture is again cooled to 0° C. and a solution of 483 g. of the sodium salt of ethylenediaminetetraacetic acid in 590 ml. of water is added slowly with stirring. The ether layer is removed and the aqueous mixture is extracted with several portions of ether. Distillation of the ether solution under reduced pressure gives cyclohexyl 3-tropanemethyl ketone boiling at 142–153° C. (0.8 to 1.1 mm.). The distilled product crystallizes to a white solid on standing.

*Cyclohexyl-1-phenyl-2-(3-tropane)ethanol.*—A solution of phenyl lithium in 130 ml. of ether is prepared in the usual way from 1.6 g. of lithium and 18 g. of bromobenzene. With stirring 10 g. of cyclohexyl 3-tropanemethyl ketone dissolved in 40 ml. of ether is slowly added to the solution cooled to 0° C. The mixture is stirred 20 minutes at 0° C. and then heated at the reflux temperature for 5 hours. Ice water (100 ml.) is slowly added with stirring and the white solid which separates is collected on a filter. The solid is stirred with equal volumes of chloroform and water for 30 minutes and the chloroform layer is separated. The ether layer of the filtrate from the solid is combined with the chloroform solution and the solvents are removed in vacuo to give solid crude 1-cyclohexyl-1-phenyl-2-(3-tropane)ethanol. After two recrystallizations of the solid from ethyl acetate, the pure product, melting at 139–140.5° C., is obtained.

*Product from the dehydration of 1-cyclohexyl-1-phenyl-2-(3-tropane)ethanol.*—A solution of one gram of 1-cyclohexyl-1-phenyl-2-(3-tropane)ethanol in a mixture of 10 ml. of glacial acetic acid and 3 ml. of 37% hydrochloric acid is heated at reflux temperature for 30 minutes. Evaporation of the solution to dryness in vacuo gives the dehydration product of the amino alcohol as a colorless oil which crystallizes when stirred with ether. The salt, when collected on a filter, rapidly absorbs water to form a crystalline hydrate. Recrystallization of the hydrochloride from ethanol-ether gives white crystals melting at 195–196° C. after drying at 100° C. in vacuo.

The dehydration product of 1-cyclohexyl-1-phenyl-2-(3-tropane)ethanol is obtained as a colorless oil by adding the hydrochloride salt obtained above to ammonium hydroxide solution and removing the amine by extraction with ether.

*1-cyclohexyl-1-phenyl-2-(3-tropane)ethane.*—The dehydration product free base obtained above (4.4 g.) dissolved in 40 ml. of ethanol is hydrogenated over Raney nickel catalyst at 60° C. and 500 p. s. i. initial pressure until hydrogen absorption ceases. After removal of the catalyst by filtration and evaporation of the solvent in vacuo, 1-cyclohexyl-1-phenyl-2-(3-tropane)ethane is obtained as a thick colorless oil.

Addition of hydrogen chloride to an ether solution of the base gives the hydrochloride salt as a white crystalline solid melting at 167–168.5° C. after recrystallization from a mixture of butanone and ether.

*1-cyclohexyl-1-phenyl-2-(3-tropane)ethane citrate.*—By adding an acetone solution of 1.2 g. of 1-cyclohexyl-1-phenyl-2-(3-tropane)-ethane to 0.7 g. of citric acid dissolved in acetone the citrate salt is obtained as a white solid melting at 153–155° C. after recrystallization from ethanol.

*1-cyclohexyl-1-phenyl-2-(3-tropane)ethane butyl-iodide.*—By heating a mixture of one gram of 1-cyclohexyl-1-phenyl-2-(3-tropane)ethane and excess butyl iodide in acetone solution at reflux temperature for 5 hours the quaternary ammonium salt is obtained as a white solid.

Example 7.—1-p-anisyl-1-phenyl-2-[3-(N-isopropylnortropane)]-ethane

*Methyl 3-(N-isopropylnortropane)acetate.*—A mixture of 16.7 g. of N-isopropylnortropanone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 60° C. Hydrogenation is interrupted when one mole equivalent of hydrogen has been absorbed. After removal of the catalyst, the solution is evaporated in vacuo on a warm water bath. The oily residue is dissolved in concentrated hydrochloric acid and the solution is extracted with several portions of ether. The aqueous acid solution is refluxed 12 hours, evaporated in vacuo, and the residue is dried by successive addition and removal by distillation of dry benzene. The crude 3-(N-isopropylnortropane)acetic acid hydrochloride so obtained is esterified by allowing its solution in 100 ml. of anhydrous methanol saturated with hydrogen chloride to stand 3 days at room temperature. Most of the methanol is distilled under reduced pressure, cold concentrated potassium hydroxide solution is added to the residue, and the product is removed by extraction with ether. Distillation of the ether solution in vacuo gives methyl 3-(N-isopropylnortropane)acetate as a colorless oil distilling at 124–127° C. (0.3 mm.).

*p-Anisyl 3-(N-isopropylnortropane)methyl ketone.*—A solution of p-anisyl magnesium bromide in 200 ml. of ether is prepared from 28 g. of p-bromoanisole and 3.7 g. of magnesium in the usual way. The solution is cooled to 0° C. and 11.3 g. of methyl 3-(N-isopropylnortropane)acetate dissolved in 25 ml. of ether is added slowly with stirring. After the addition the mixture is stirred for one hour at room temperature and is then heated at reflux temperature for 2 hours. The mixture is cooled to 0° C. and a solution of 135 g. of the sodium salt of ethylenediamine tetraacetic acid in 180 ml. of water is added slowly with stirring. The ether layer is removed and the aqueous layer is extracted with two portions of chloroform. Evaporation of the solvents from the combined extracts gives the crude product as a thick oil which is purified by distillation under reduced pressure. p-Anisyl 3-(N-isopropylnortropane)-methyl ketone obtained in this way boils at 160–164° C. (0.2 mm.) and crystallizes as a white solid upon standing.

*1 - (p - anisyl) - 1 - phenyl - 2 - [3 - (N - isopropylnortropane)]-ethanol.*—To a solution of phenyl lithium in 45 ml. ether, prepared in the usual way from 7.9 g. of bromobenzene and 0.7 g. of lithium, is slowly added with stirring at 0° C. a solution of 7.5 g. of p-anisyl 3-(N-isopropylnortropane)methyl ketone in 20 ml. of ether. Following the addition the mixture is stirred at 0° C. for one hour, and then at room temperature for four hours. Water (50 ml.) is then added and the mixture is stirred vigorously for 2 hours. The ether layer is removed and the aqueous mixture is extracted with two portions of chloroform. Evaporation of the solvents from the combined extracts gives a crystalline residue of crude product which is purified by recrystallization from ethyl acetate. In this way, 1 - (p - anisyl) - 1 - phenyl - 2 - [3 - (N - isopropylnortropane)]-ethanol is obtained as a white crystalline solid.

*1 - p - anisyl - 1 - phenyl - 2 - [3 - (N - isopropylnortropane)]-ethylene.*—A mixture of 2 g. of 1-p-anisyl-1-phenyl-2-[3-(N-isopropylnortropane)]ethanol, 4 g. of oxalic acid and 6 ml. of water is heated at reflux temperature for 4 hours. The cooled mixture is made alkaline with 10% sodium hydroxide solution and the product is removed by extraction with ether. By evaporation of the ether solution 1-p-anisyl-1-phenyl-2-[3-(N-isopropylnortropane)]-ethylene is obtained.

*1 - p - anisyl - 1 - phenyl - 2 - [3 - (N - isopropylnortropane)]ethane.*—By hydrogenation of one gram of 1-p-anisyl - 1 - phenyl - 2 - [3 - (N - isopropylnortropane)]-ethylene under the conditions described in Example 2, 1 - p - anisyl - 1 - phenyl - 2 - [3 - (N - isopropylnortropane)]-ethane is obtained.

The methobromide salt of the base is formed by adding the amine to an acetone solution of methyl bromide.

*Example 8.—1,1-diphenyl-3-(3-tropane)propane*

*2-(3-tropane)ethanol.*—To a stirred solution of 30 g. of lithium aluminum hydride in 2 liters of dry ether is added a solution of 164 g. of ethyl 3-tropaneacetate (made following the procedure of Example 2) in 500 ml. of ether at such a rate that steady reflux of ether is maintained. After the mixture is stirred at reflux temperature for 3 hours, it is cooled to 0° C. and 72 ml. of water is added gradually. The resulting mixture is stirred for 1.5 hours, filtered and the solid collected is washed with ether. Evaporation of ether from the filtrate gives solid 2-(3-tropane)ethanol which, after recrystallization from a mixture of benzene and petroleum ether, melts at 63–64° C.

*1-chloro-2(3-tropane)ethane hydrochloride.*—To a solution of 10 g. of 2-(3-tropane)ethanol in 50 ml. of chloroform is slowly added 14.3 g. of thionyl chloride. The reaction mixture is heated at gentle reflux for 45 minutes and then evaporated to dryness in vacuo. Recrystallization of the light tan solid residue from a mixture of alcohol and ether gives pure 1-chloro-2(3-tropane)ethane hydrochloride, M. P. 167–168° C.

To obtain the free chloro amine the hydrochloride salt is treated with potassium carbonate solution and the oily base extracted with ether. Distillation of the ether solution gives 1-chloro-2(3-tropane)ethane, B. P. 81° C. (0.8 mm.).

*β - (3 - tropane)propionitrile.*—1 - chloro - 2(3 - tropane)ethane (47 g.) and 0.1 g. of sodium iodide are added to a solution of 49 g. of potassium cyanide in a mixture of 175 ml. of alcohol and 75 ml. of water. The resulting solution is heated at reflux temperature for 17 hours and then evaporated in vacuo. Sodium hydroxide solution is added to the residual mixture of oil and solid and the oil separated by extraction with ether. Distillation of the ether solution gives β-(3-tropane)propionitrile, B. P. 114–116° C. (0.3 mm.); $n_D^{25}$ 1.4958.

*Ethyl-β-(3-tropane)propionate.*—A solution of 25 g. of β-(3-tropane)-propionitrile in 100 ml. of 37% hydrochloric acid is heated at reflux temperature for several hours and then evaporated to dryness in vacuo. The solid residue is dissolved in 300 ml. of absolute ethanol, 5 ml. of concentrated sulfuric acid is added and the resulting solution heated at reflux temperature for 6 hours. The mixture is concentrated in vacuo and the residue treated with 40% sodium hydroxide solution. The oil which separates is removed by extraction with ether and purified by distillation in vacuo. In this way ethyl β-(3-tropane)propionate distilling at 97–100° C. (0.4 mm.) was obtained; $n_D^{25}$ 1.4770.

*1,1-diphenyl-3-(3-tropane)propanol.*—A solution of phenyl lithium in 500 ml. of ether is prepared in the usual way from 75 g. of bromobenzene and 6.7 g. of lithium. To the stirred solution is slowly added 18 g. of ethyl β-(3-tropane)propionate disrolved in 50 ml. of ether. The mixture is stirred and heated at reflux temperature for 3.5 hours. After cooling 50 ml. of water is added and the mixture stirred vigorously for one hour. The ether layer is removed and the aqueous layer which contains a white solid is shaken vigorously with chloroform. The chloroform layer is separated, combined with the ether solution and the solvents are evaporated in vacuo. In this way, 1,1-diphenyl-3-(3-tropane)propanol is obtained as a white crystalline solid melting at 141–142.5° C.

*1,1-diphenyl-3-(3-tropane)-1-propene.*—A solution of 15 g. of 1,1-diphenyl-3-(3-tropane)propanol in 50 ml. of 37% hydrochloric acid is heated at 100° C. for 1.5 hours and then evaporated to dryness in vacuo. The residue is dissolved in water, the solution made strongly basic by addition of 40% aqueous sodium hydroxide solution, and the product is separated by extraction with ether. Distillation of the ether solution gives 1,1-diphenyl-3-(3-tropane)-1-propene distilling at 170–173° C. (0.4 mm.). The base melts at 59–60° C.

*1,1 - diphenyl - 3 - (3 - tropane)propane.*—1,1 - dipheny-3-(3-tropane)-1-propene (4.7 g.) dissolved in 100 ml. of ethanol is hydrogenated over 5 g. of Raney nickel catalyst at room temperature and 60 p. s. i. until hydrogen absorption ceases. The catalyst is removed by filtration and the filtrate evaporated to dryness in vacuo to give 1,1-diphenyl-3-(3-tropane)propane as a viscous oil.

*1,1-diphenyl-3-(3-tropane)propane citrate.*—To a solution of 3 g. of the base prepared above dissolved in 25 ml. of acetone is added 2 g. of citric acid dissolved in 20 ml. of acetone. The white solid which separates is collected on a filter and washed with acetone. The citrate salt of 1,1-diphenyl-3-(tropane)propane obtained in this way melts at 170° C.

*1,1-diphenyl-3-(3-tropane)propane methobromide.*—By allowing a mixture of one gram of 1,1-diphenyl-3-(3-tropane)propane and excess methyl bromide in acetone solution to stand for three hours at room temperature, the methobromide of 1,1-diphenyl-3-(3-tropane)propane is obtained. The salt melts at 277° C.

*Example 9.—1-(2-pyridyl)-1-p-tolyl-4-(3-tropane)butane*

*3(3-tropane)propanol.*—To a stirred solution of 3 g. of lithium aluminum hydride in 200 ml. of ether is added a solution of 17.8 g. of ethyl β-(3-tropane)propionate, made as in Example 8, in 50 ml. of ether at such a rate that steady reflux of ether is maintained. After the mixture is stirred at reflux temperature for three hours, it is cooled to 0° C. and 7.2 ml. of water is added gradually. The resulting mixture is stirred for two hours, filtered and the collected solid is washed with ether. Distillation of the ether solution in vacuo gives 3-(3-tropane)propanol boiling at 128–131° C. (2 mm.).

*1-chloro-3-(3-tropane)propane.*—To a solution of 7.7 g. of 3-(3-tropane)propanol in 30 ml. of chloroform is slowly added 10 g. of thionyl chloride. The reaction mixture is heated at gentle reflux for 45 minutes and then evaporated to dryness in vacuo. The residue of crude 1-chloro-3-(3-tropane)propane hydrochloride is treated with potassium carbonate solution and the oily base which forms is extracted with ether. Distillation of the ether solution gives 1-chloro-3-(3-tropane)propane boiling at 100–102° C. (1 mm.).

*γ-(3 - tropane)butyronitrile.*—1 - chloro - 3 - (3 - tropane)propane (5 g.) and 0.1 g. of sodium iodide is added to a solution of 5 g. of potassium cyanide in a mixture of 18 ml. of alcohol and 8 ml. of water. The resulting solution is heated at reflux temperature for 18 hours and then evaporated in vacuo. Sodium hydroxide solution is added to the residual mixture of oil and solid and the oil is separated by extraction with ether. Distillation of the ether solution under reduced pressure gives γ-(3-tropane)butyronitrile boiling at 132–135° C. (0.3 mm.).

*Ethyl γ-(3-tropane)butyrate.*—A solution of 3 g. of γ-(3-tropane)-butyronitrile in 15 ml. of 37% hydrochloric acid is heated at reflux temperature for several hours and then evaporated to dryness in vacuo. The solid residue is dissolved in 35 ml. of absolute ethanol, 0.5 ml. of concentrated sulfuric acid is added, and the resulting solution is heated at reflux temperature for 7 hours. The mixture is concentrated in vacuo and the residue is treated with 40% sodium hydroxide solution. The oil which separates is removed by extraction with ether and purified by distillation under reduced pressure. In this way, ethyl γ-(3-tropane)-butyrate distilling at 115–119° C. (0.5 mm.) is obtained.

*p-Tolyl γ-(3-tropane)-propyl ketone.*—A solution of p-tolyl magnesium bromide in 40 ml. of ether is prepared in the usual way from 5.1 g. of p-bromotoluene and 0.75 g. of magnesium. To the stirred solution, cooled to 0° C., is slowly added a solution of 2.3 g. of ethyl γ-(3-tropane)butyrate in 10 ml. of ether. After the addition the mixture is stirred at room temperature for one hour and then at reflux temperature for 2 hours. The mixture is cooled to 0° C. and a solution of 27 g. of the sodium salt of ethylenediaminetetraacetic acid in 36 ml. of water is added slowly with stirring. The ether layer is removed and the aqueous layer is extracted with several portions of ether. Distillation of the ether extracts under reduced pressure gives p-tolyl γ-(3-tropane)propyl ketone boiling at 188–192° C. (0.2 mm.).

*1-(2-pyridyl)-1-p-tolyl-4-(3-tropane)butanol.* — A solution of n-butyl lithium in 15 ml. of ether is prepared in the usual way from 1.9 g. of n-butyl chloride and 0.35 g. of lithium. With stirring the solution is cooled to −45° C. and 2.8 g. of 2-bromopyridine dissolved in 5 ml. of ether is added slowly. After the addition the mixture is stirred 10 minutes and 1.5 g. of p-tolyl γ-(3-tropane)-propyl ketone dissolved in 15 ml. of ether is added slowly. The mixture is then stirred 15 minutes at −15° C. Water (25 ml.) is added slowly and the mixture is stirred vigorously for 30 minutes. The ether layer is removed and the aqueous layer is stirred vigorously with an equal volume of chloroform until two clear layers result. Evaporation in vacuo of the solvents from the combined ether and chloroform solutions gives a yellow oil which crystallizes when stirred with a mixture of ether and petroleum ether. By recrystallization of the product from a mixture of ethyl acetate and petroleum ether 1-(2-pyridyl)-1-p-tolyl-4-(3-tropane)-butanol is obtained as a white crystalline solid.

*1-(2 - pyridyl) - 1-p-tolyl-4-(3-tropane)-1-butene.* — A mixture of 0.5 g. of 1-(2-pyridyl)-1-p-tolyl-4-(3-tropane)-1-butanol and 2 ml. of 85% sulfuric acid is heated at 155° C. for 15 minutes. The solution is poured onto ice and the mixture made alkaline with ammonium hydroxide. By extraction of the mixture with ether and evaporation of the solvent 1-(2-pyridyl)-1-p-tolyl-4-(3-tropane)-1-butene is obtained.

*1 - (2 - pyridyl - 1 - p - tolyl - 4 - (3 - tropane)butane.*— By reduction of the 1-(2-pyridyl)-1-p-tolyl-4-(3-tropane)-1-butene following the procedure described in Example 3, 1-(2-pyridyl)-1-p-tolyl-4-(3-tropane)butane is obtained.

*Example 10.—3-isopropyltropane*

*Dimethyl 3-tropanecarbinol.*—A solution of methyl lithium in 150 ml. of ether is prepared in the usual way from 28.4 g. of methyl iodide and 2.8 g. of lithium. To the solution cooled to 0° C. is added slowly with stirring a solution of 9.2 g. of methyl 3-tropanecarboxylate (made following the procedure of Example 1) in 30 ml. of ether. After the addition the mixture is stirred at 0° C. for one hour and then heated at reflux temperature for 3 hours. The mixture is cooled to 0° C. and decomposed by slow addition of 50 ml. of water. The ether layer is removed and the aqueous phase is stirred vigorously with an equal volume of chloroform until two clear layers result. By evaporation of the combined extracts in vacuo dimethyl 3-tropanecarbinol is obtained as a yellow oil which crystallizes as a white solid when stirred with a small volume of ether.

*Product from the dehydration of dimethyl 3-tropanecarbinol.*—Dimethyl 3-tropanecarbinol (5 g.) is dissolved in 50 ml. of glacial acetic acid and 15 ml. of 37% hydrochloric acid and the solution is heated at reflux temperature for 45 minutes. Evaporation of the solution to dryness in vacuo gives the dehydration product of the carbinol in the form of its hydrochloride salt.

*3-isopropyltropane.*—The unsaturated product (2.5 g.) obtained above is dissolved in ethanol and hydrogenated over Raney nickel catalyst at 60° C. and 500 p. s. i. hydrogen pressure. After removal of the catalyst by filtration and evaporation of the solvent in vacuo, 3-isopropyltropane is obtained as a colorless oil.

*Example 11.—2-n-hexyl-1-[3-(N-isopropylnortropane)] octane*

*1,1 - di - n - hexyl - 2 - [3 - (N - isopropylnortropane)]-ethanol.*—A solution of n-hexyl lithium in 150 ml. of ether is prepared in the usual way from 33 g. of n-hexyl bromide and 3 g. of lithium. To the solution cooled to 0° C. is added slowly with stirring a solution of 11.3 g. of methyl 3-(N-isopropylnortropane)-acetate (made as in Example 7) in 40 ml. of ether. After the addition the mixture is stirred at 0° C. for one hour and then heated at reflux temperature for 3 hours. The mixture is cooled to 0° C. and decomposed by slow addition of 50 ml. of water. The ether layer is removed and the aqueous phase is stirred vigorously with an equal volume of chloroform until two clear layers result. By evaporation of the combined extracts in vacuo and stirring the residual oily residue with petroleum ether, 1,1-di-n-hexyl-2-[3-(N-isopropylnortropane)]ethanol is obtained as a white crystalline solid.

*Product from the dehydration of 1,1-di-n-hexyl-2-[3-(N-isopropylnortropane)]ethanol with hydrochloric acid.*—A solution of 8 g. of 1,1-di-n-hexyl-2-[3-(N-isopropylnortropane)]-ethanol in a mixture of 80 ml. of glacial acetic acid and 25 ml. of 37% hydrochloric acid is heated at reflux temperature for 45 minutes. Evaporation of the solution to dryness in vacuo gives the dehydration product of the carbinol in the form of its hydrochloride salt.

*2-n-hexyl-1-[3-(N-isopropylnortropane)]octane.* — The hydrochloride salt of the dehydrated carbinol obtained above is dissolved in ethanol and hydrogenated over Raney nickel catalyst at 60° C. and 500 p. s. i. hydrogen pressure. After removal of the catalyst by filtration and evaporation of the solvent in vacuo, 2-n-hexyl-1-[3-(N-isopropylnortropane)]octane is obtained as a colorless oil.

*Example 12.—1-cyclopentyl-1-phenyl-4-(3-tropane) butane*

*Cyclopentyl 3-(3-tropane)propyl ketone.*—A solution of cyclopentyl magnesium bromide in 350 ml. of ether is prepared in the usual way from 5.8 g. of magnesium and 37 g. of cyclopentyl bromide. To the stirred solution cooled to 0° C. is added slowly 14.3 g. of ethyl γ-(3-tropane)butyrate (prepared as in Example 9) dissolved in 30 ml. of ether. The mixture is stirred at 0° C. for one hour and then heated at reflux temperature for 3 hours. The mixture is then cooled to 0° C. and a solution of 242 g. of the sodium salt of ethylenediamine tetraacetic acid in 300 ml. of water is added slowly with stirring. The ether layer is removed and the aqueous phase is extracted with several portions of ether. Distillation of the ether extract under reduced pressure gives cyclopentyl 3-(3-tropane)propyl ketone boiling at 152–156° C. (0.8 mm.).

*Product from the dehydration of 1-cyclopentyl-1-phenyl-4-(3-tropane)butanol with hydrochloric acid.*—A solution of 3.5 g. of 1-cyclopentyl-1-phenyl-4-(3-tropane)butanol in a mixture of 35 ml. of glacial acetic acid and 10 ml. of 37% hydrochloric acid is heated at reflux temperature for 45 minutes. Evaporation of the solution to dryness in vacuo gives the dehydration product of the carbinol in the form of its hydrochloride salt.

The salt is added to excess concentrated ammonium hydroxide solution and the mixture is extracted with two portions of ether. Evaporation of the ether gives the free olefinic base as a pale yellow oil.

*1-cyclopentyl-1-phenyl-4-(3-tropane)butane.*—The unsaturated base (2 g.) obtained above is dissolved in ethanol and hydrogenated over Raney nickel catalyst at 60° C. and 500 p. s. i. hydrogen pressure. After removal of the catalyst by filtration and evaporation of the solvent in vacuo, 1-cyclopentyl-1-phenyl-4-(3-tropane)butane is obtained as a colorless oil.

The compounds of Formulas 3, 4 and 5 and the dehydration products of Formula 4 are the subject matter of my copending applications Serial No. 519,647, filed July 1, 1955; Serial No. 519,649, filed July 1, 1955; Serial No. 519,648, filed July 1, 1955; and Serial No. 519,650, filed July 1, 1955, respectively, and reference may be made thereto for further examples of these compounds as well as for methods of their preparation.

It is not desired to be limited except as set forth in the following claims.

What is claimed is:

1. Compounds of the class consisting of a free base and the acid addition and quaternary ammoniun salts thereof, the free base having the following formula:

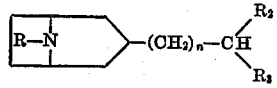

in which R is lower alkyl, $n$ is from 0 to 2 and $R_2$ and $R_3$ are selected from the group consisting of lower alkyl, cycloalkyl having from 5 to 6 carbon atoms, cycloalkylalkyl having from 6 to 10 carbon atoms, 2-pyridyl, phenyl, phenyl substituted with alkyl groups having 1 to 4 carbon atoms and phenyl substituted with alkoxy groups having 1 to 4 carbon atoms.

2. 3-benzohydryltropane.
3. 3-benzohydryltropane methobromide.
4. 1,1-diphenyl-2-(3-tropane)ethane.
5. 1,1-diphenyl-2-(3-tropane)ethane methobromide.
6. 1-cyclohexyl-1-phenyl-2-(3-tropane)ethane.

References Cited in the file of this patent

Coleman et al.: Chem. Abstracts, vol. 37, col. 5703 (1943).